United States Patent [19]

Nakai et al.

[11] Patent Number: 5,113,067
[45] Date of Patent: May 12, 1992

[54] IMAGE READING APPARATUS HAVING A BLAZED DIFFRACTION GRATING

[75] Inventors: Takehiko Nakai, Yamato; Michitaka Setani, Kawasaki, both of Japan

[73] Assignee: Canon Kabushiki Kaisha, Tokyo, Japan

[21] Appl. No.: 479,606

[22] Filed: Feb. 13, 1990

[30] Foreign Application Priority Data

Feb. 15, 1989 [JP] Japan .................. 1-35694
Feb. 23, 1989 [JP] Japan .................. 1-44390

[51] Int. Cl.⁵ .............................. H01J 40/14
[52] U.S. Cl. .................. 250/208.1; 359/571
[58] Field of Search ......... 250/208.1, 208.2, 237 G, 250/216; 350/162.17, 162.19, 162.22

[56] References Cited

U.S. PATENT DOCUMENTS

| | | |
|---|---|---|
| 4,277,138 | 7/1981 | Dammann . |
| 4,539,482 | 9/1985 | Nose .................. 250/208.1 |
| 4,641,944 | 2/1987 | Honda et al. . |
| 4,708,436 | 11/1987 | Kleinknecht .......... 350/162.22 |

FOREIGN PATENT DOCUMENTS

2645075 4/1978 Fed. Rep. of Germany .

OTHER PUBLICATIONS

Applied Optical article entitled "Color Separation Gratings", vol. 17, No. 15, Aug. 1, 1978, pp. 2273-2279.

*Primary Examiner*—David C. Nelms
*Attorney, Agent, or Firm*—Fitzpatrick, Cella, Harper & Scinto

[57] ABSTRACT

An image reading apparatus comprises a multiline sensor on which a plurality of linear sensor arrays are arranged on and a single substrate, a focusing optical system for focusing an object image on the multiline sensor. A blazed diffraction grating is disposed in an optical path between the focusing optical system and the multiline sensor, for color-separating light from the object into a plurality of light components, and for guiding the color-separated light components to the corresponding sensor arrays. The grating thickness of the blazed diffraction grating varies in correspondence with an angle of light incident on the blazed diffraction grating.

27 Claims, 6 Drawing Sheets

FIG. 4
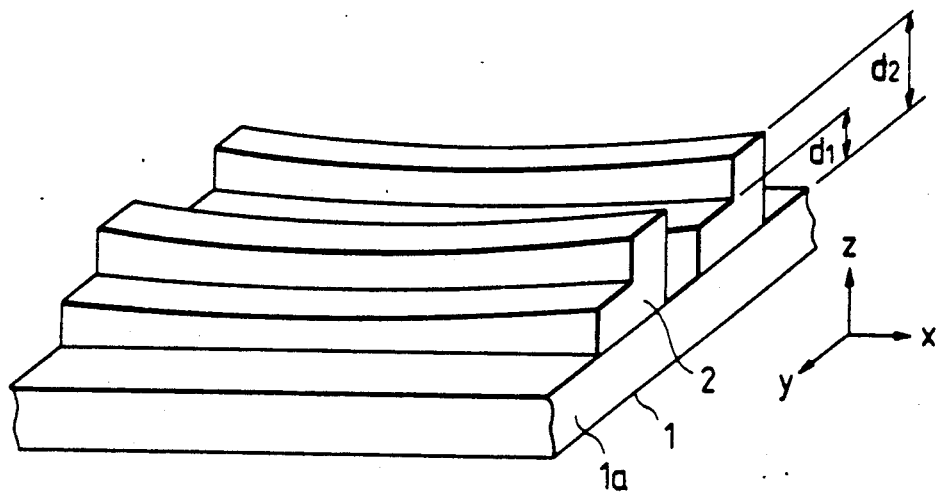
FIG. 5A
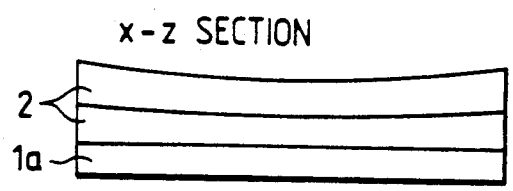
FIG. 5C
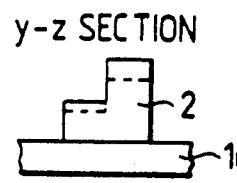
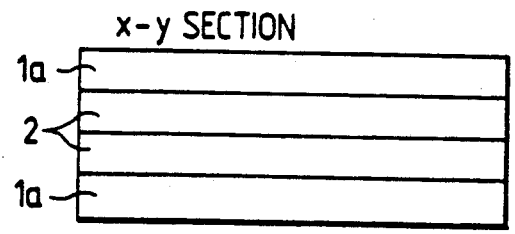
FIG. 5B

IMAGE READING APPARATUS HAVING A BLAZED DIFFRACTION GRATING

BACKGROUND AND SUMMARY OF THE INVENTION

The present invention relates to an apparatus for reading a color image using a solid-state image pickup element or the like, and, more particularly, to a color image reading apparatus for guiding light from an object to a sensor such as a solid-state image pickup element through a focusing optical system and a color separation means.

As an apparatus for line-scanning an object such as an original in a sub-scanning direction and reading a color image using an array of solid-state image pickup elements (e.g., CCD sensors), an apparatus shown in FIG. 1 is known. In FIG. 1, information on a portion of an original illuminated with light from an illumination light source (not shown) is color-separated into three color components by a three-piece (3P) prism 20 through a focusing optical system 19. The three color components are then focused on and read by three 1-line CCD sensors 21, 22, and 23.

In this prior art, however, three independent sensors are required, and the 3P prism 20 must have high precision, resulting in high manufacturing cost. Furthermore, adjustment between focused light beams and the sensors 21, 22, and 23 is required at three different positions, resulting in great difficulty during manufacturing.

Three parallel lines of sensor arrays may be mounted on a single substrate to be separated by a finite distance, and three lines of sensors may be formed on one element as a monolithic three-line sensor.

Such a three-line sensor 24 is shown in FIG. 2A. In FIG. 2A, distances $S_1$ and $S_2$ between two adjacent lines of three lines 25, 26, and 27 are set to be, e.g., about 0.1 to 0.2 mm due to various manufacturing conditions. In FIG. 2B, dimension a and b of each unit element 28 are, e.g., about 7 $\mu$m × 7 $\mu$m or 10 $\mu$m × 10 $\mu$m.

FIG. 3 shows a known arrangement of a color image reading apparatus using the above-mentioned monolithic three-line sensor as a light-receiving element. In FIG. 3, when information on an original surface 18 is line-scanned and read in the sub-scanning direction, light reflected by the original surface 18 is color-separated into three color light components by color separation beam splitters 30 and 31 each having a dichroic selective transmission film through a focusing optical system 19, and these light components are focused on the corresponding sensor arrays 34, 35, and 36 on a monolithic 3-line sensor 32.

As shown in FIG. 3, however, when the thickness of each of the beam splitters 30 and 31 is represented by t, an interarray distance on the sensor 32 is given by $2\sqrt{2}t$. If the interarray distance ($2\sqrt{2}t$) is set to be 0.1 to 0.2 mm, as described above, the thickness (t) is about 35 to 70 $\mu$m. This numerical value does not allow easy manufacture in consideration of a required flatness or the like of a surface.

Furthermore, a color image reading apparatus using a blazed diffraction grating in place of a dichroic mirror is also known by U.S. Pat. No. 4,277,138 (corresponding to DE2645075). In this arrangement, an optical system using a blazed diffraction grating is provided as a color separation means.

With this arrangement, however, light from only one point of an object is taken into consideration, and no consideration is given to so-called field angle characteristics based on a finite read width in the main scanning direction which is present in an object surface.

SUMMARY OF THE INVENTION

It is therefore an object of the present invention to provide an image reading apparatus using a linear (unidimensional) blazed diffraction grating having a specific form to solve the above problems.

In an image reading apparatus according to the present invention, a light beam reflected at a certain angle by an object is separated into light components of different wavelength ranges through a focusing optical system and a linear blazed diffraction grating, and these light components are focused on corresponding sensor arrays on a sensor. In addition, a grating thickness of the linear blazed diffraction grating is changed in correspondence with a field angle of a main ray of a light beam incident on the grating.

In another image reading apparatus according to the present invention, a light beam reflected at a certain angle by an object is separated into light components of different wavelength ranges through a focusing optical system and a linear blazed diffraction grating, and these light components are focused on corresponding sensor arrays on a sensor. In addition, a grating pitch of the linear blazed diffraction grating is changed in correspondence with an exit angle of light emerging from the focusing optical system, which is changed in accordance with a field angle.

In still another image reading apparatus according to the present invention, a light beam reflected at a certain angle by an object is separated into light components of different waveform ranges through a focusing optical system and a linear blazed diffraction grating, and these light components are focused on corresponding sensor arrays on a sensor. In addition, the linear blazed diffraction grating is curved along the array direction of the sensor array so that its concave surface faces the focusing optical system.

BRIEF DESCRIPTION OF THE DRAWINGS

FIGS. 4, 5A, 5B and 5C are views showing a linear blazed diffraction grating used in an embodiment of the present invention;

DESCRIPTION OF THE PREFERRED EMBODIMENTS

FIGS. 4 and 5 show a linear blazed diffraction grating 1 used in an embodiment of the present invention. The blazed diffraction grating 1 has stepped diffraction gratings 2 (each constituted by portions respectively having thicknesses $d_1$ and $d_2$) periodically formed on a diffraction grating substrate $1a$ in the Y direction. The thicknesses $d_1$ and $d_2$ of each diffraction grating 2 are changed along the X direction, as shown in FIG. 4 and in an X-Z section of FIG. 5.

Figure 1:
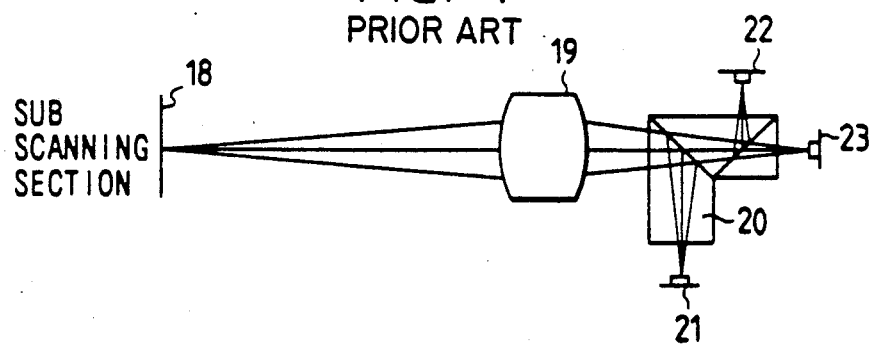
FIGS. 1 and 3 are views showing conventional color image reading apparatuses.
Figure 2A:
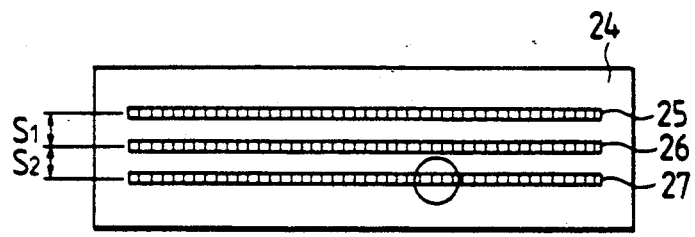
FIGS. 2A and 2B are views showing a structure of a monolithic three-line sensor.
Figure 2B:
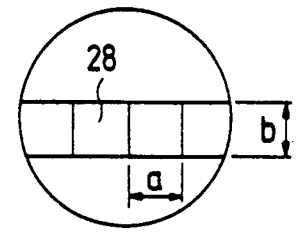
Figure 3:
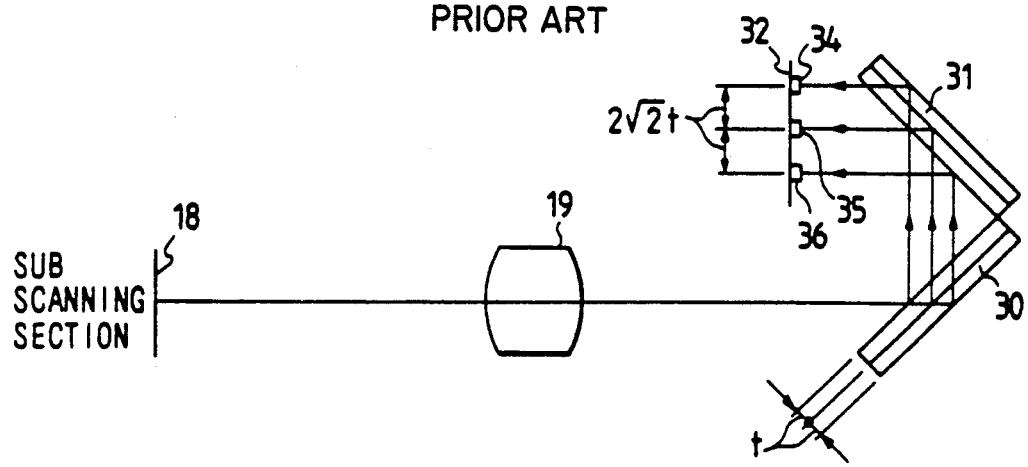
Figure 6A:
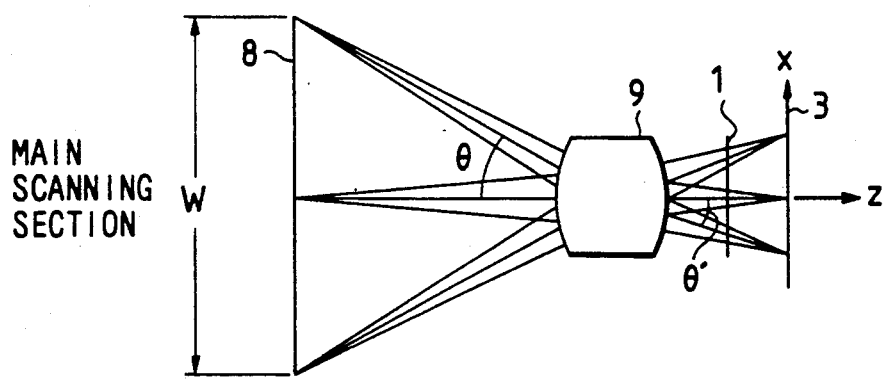
FIGS. 6A and 6B are views showing an image reading apparatus according to the present invention.
Figure 6B:
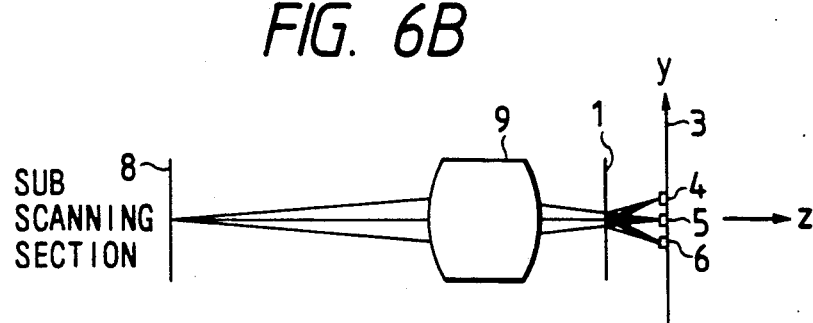

FIGS. 6A and 6B show an image reading apparatus of the present invention, which includes the above-mentioned linear blazed diffraction grating. FIG. 6A is a view taken in the main scanning section, and FIG. 6B shows the sub-scanning section perpendicular to the main scanning section. In FIGS. 6A and 6B, image information on an original surface 8 is line-scanned by a mirror (not shown) arranged between the original surface 8 and a focusing optical system 9 in the sub-scanning direction (Y direction in FIG. 6B). Image information light is guided to the linear blazed diffraction grating 1 for three-color separation through the focusing optical system 9. More specifically, the original surface 8 and the image reading apparatus (the focusing optical system 9, the linear blazed diffraction grating 1, and a monolithic three-line sensor 3) are moved relative to each other in the sub-scanning direction, thereby reading image information on the original surface 8. The information light is separated into three color light components (e.g., R, G, and B) in so-called color reading, and the three light components are then focused on sensor arrays 4, 5, and 6 on the sensor 3. The sensor surface of the three-line sensor 3 is arranged to be parallel to the line scanning direction (sub-scanning direction).

The sensor arrays 4, 5, and 6 on the sensor 3 extend in the main scanning direction (X direction in FIG. 6A). The sensor 3 is a multiline sensor on which a plurality of linear sensor arrays are formed on a single substrate. The multiline sensor is a monolithic three-line sensor on which three lines of linear sensor arrays are arranged to be separated in a direction perpendicular to the array direction of the sensor array by a finite distance.

The linear blazed diffraction grating 1 is inserted in an optical path between the focusing optical system 9 and the sensor 3 to separate light reflected by an object into a plurality of color light components, and to guide the separated light components to the corresponding sensor arrays.

Of course, the original surface 8 is illuminated with an illumination light source (not shown) in order to read information.

The linear blazed diffraction grating 1 separates light reflected by an object into a plurality of color light components in the sub-scanning direction perpendicular to the array direction.

In order to help understand the principle of the present invention, problems posed when a conventional linear blazed diffraction grating is used in the arrangement shown in FIG. 6 will be explained in detail below.

Figure 7:
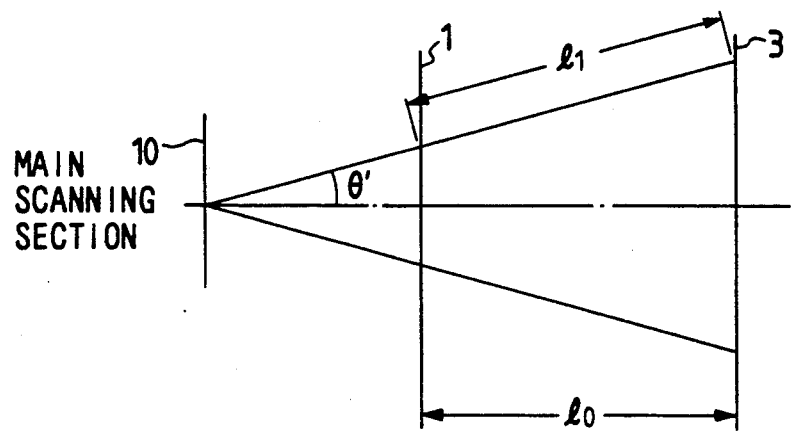
FIG. 7 is a view for explaining an optical path length between the blazed diffraction grating and a three-line sensor.

When an actual reading apparatus is constituted, a finite read width w is required, as shown in FIG. 6A, and a field angle $\theta$ is present with respect to the focusing optical system 9. Therefore, in the main scanning section, a principal ray of a light beam emerging from a point outside the optical axis of the focusing optical system is incident on the focusing optical system 9 at an angle $\theta$, and emerges from its exit pupil 10 at an angle $\theta$, as shown in FIG. 7. In a normal optical system, $\theta \cong \theta'$.

FIG. 7 is a view for explaining an optical path length between the blazed diffraction grating and the three-line sensor.

Figure 8:
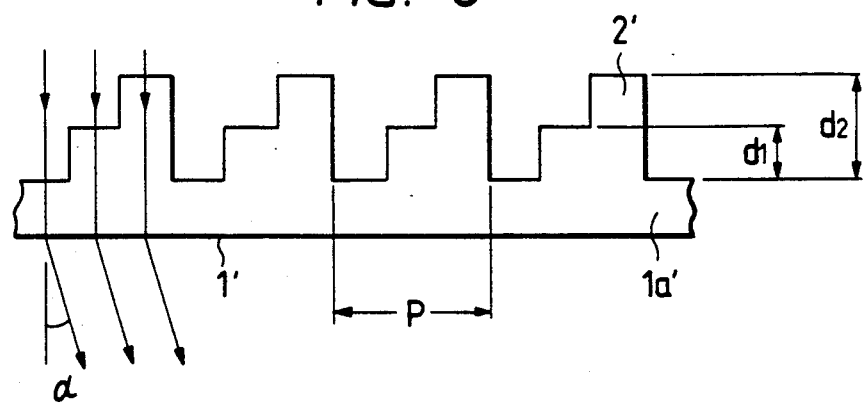
FIGS. 8 and 9 are views for explaining a function of the linear blazed diffraction grating.
Figure 9:
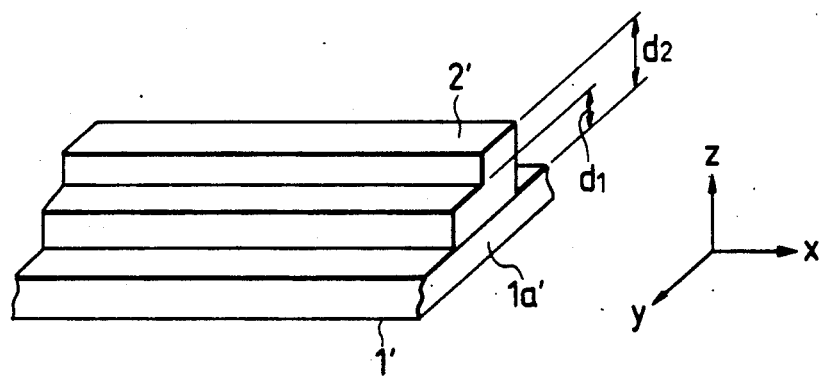

FIGS. 8 and 9 are views for explaining the function of the linear blazed diffraction grating, and show a linear blazed diffraction grating having a constant grating thickness and a constant grating pitch for the purpose of comparison with the present invention.

A blazed diffraction grating of this type is described in Applied Optics, Vol. 17, No. 15, pp. 2273 to 2279 (Aug. 1, 1978).

An effective optical path length in each grating 2' varies between a case wherein the principal ray of a light beam having the above-mentioned field angle is incident at an angle $\theta$ on a blazed diffraction grating 1' having constant grating thicknesses $d_1$ and $d_2$, as shown in FIGS. 8 and 9, and a case wherein the principal ray is perpendicularly incident on the grating. As a result, blaze wavelengths of these cases are different from each other.

This is because a blaze wavelength $\lambda$ and a thickness $d_i$ have the following relationship:

$$\Phi_i = 2\pi \left( \frac{n_\lambda^2}{(n_\lambda^2 - \sin^2\theta')^{\frac{1}{2}}} - \frac{1}{\cos\theta'} \right) \times \frac{d_i}{\lambda}$$

$$(i = 1, 2)$$

where $\Phi_i$ is the phase difference (rad), and $n_\lambda$ is the refractive index of a grating medium with respect to light of the wavelength $\lambda$.

More specifically, the wavelength $\lambda$ for obtaining a desired phase difference $\Phi_i$ for diffracted light of a predetermined order is shifted toward a short wavelength side as a field angle is increased, i.e., as $\theta'$ is increased as long as the grating thickness $d_i$ is constant, as shown in FIG. 9. This means that a wavelength distribution of a wavelength range of a light component received by each sensor array is shifted as a distance from the optical axis is increased when image information on one line having the width w is read, resulting in color misregistration (shift).

For example, in the blazed diffraction grating 1' having a two-stepped structure shown in FIGS. 8 and 9, when $d_1 = 3{,}100$ nm, $d_2 = 6{,}200$ nm, and $n_\lambda = 1.5$, the blaze wavelength of first-order diffracted light is 516.7 nm (for $\Phi_1 = 6\pi$ and $\Phi_2 = 12\pi$) on the axis of $\theta' = 0$. However, at a position outside the axis, e.g., at $\theta' = 20°$, this wavelength becomes 492.3 nm. Thus, the wavelength is shifted by about 24 nm.

As can be seen from the above equation of the phase difference $\Phi_i$, attention is paid to the fact that if the thickness $d_i$ of the diffraction grating is changed in correspondence with the field angle $\theta'$, the blaze wavelength $\lambda$ can be made constant. This is the gist of the present invention. For example, as described above, if $d_1 = 3{,}100$ nm, $d_2 = 6{,}200$ nm, and $n_\lambda = 1.5$, the blaze wavelength is 516.7 nm (for $\Phi_1 = 6\pi$ and $\Phi_2 = 12\pi$) at $\theta' = 0$. When $d_1$ and $d_2$ are determined so that the blaze wavelength has the above value even at $\theta' = 20°$, $d_1 = 3{,}253.7$ nm and $d_2 = 6{,}607.4$ nm.

Therefore, when the grating thicknesses $d_1$ and $d_2$ at a position where the principal ray having the field angle $\theta' = 20°$ is transmitted through the diffraction grating 1 are increased, as described above, the blaze wavelength can be kept constant both on the axis and outside the axis. The grating thicknesses $d_1$ and $d_2$ of the linear blazed diffraction grating 1 of the present invention shown in FIGS. 4 and 5 are changed to be increased as a distance from the axis is increased. Thus, wavelength ranges of three light components color-separated by this grating are equal to each other over the entire field angle.

The thickness of the linear blazed diffraction grating of the present invention is continuously changed along the X direction perpendicular to the Y direction along which stepped diffraction gratings are periodically formed and to the Z direction as the thickness direction of the diffraction grating, as shown in FIG. 4.

In this manner, the grating thickness of the blazed diffraction grating is changed in correspondence with an angle of light incident on the diffraction grating.

The grating thickness of the blazed diffraction grating is changed in correspondence with a field angle with respect to the focusing optical system.

Moreover, the grating thickness of the blazed diffraction grating is changed in correspondence with a field angle of the principal ray of light incident from an object on the diffraction grating.

As described above, according to the present invention, since the grating thickness of the linear blazed diffraction grating is adjusted in correspondence with the field angle of incident light, images which have the same blaze wavelength and are free from color shift can be focused on the corresponding sensor arrays for light from the entire object. Information light having a field angle can also be satisfactorily color-separated and focused on the corresponding sensor array without shifting a wavelength distribution, i.e., color misregistration. Thus, a compact, inexpensive image reading apparatus can be provided.

Another problem caused by a field angle $\theta \approx \theta'$ will be examined below.

An optical path length between the blazed diffraction grating 1 and the three-line sensor 3 for a light ray on the optical axis is $l_0$, as shown in FIG. 7. However, since a light ray outside the optical axis and having an incident angle $\theta$ emerges from the exit pupil 10 at an exit angle $\theta'$, the distance is $l_1 = l_0/\cos \theta' > l_0$.

Figure 10:
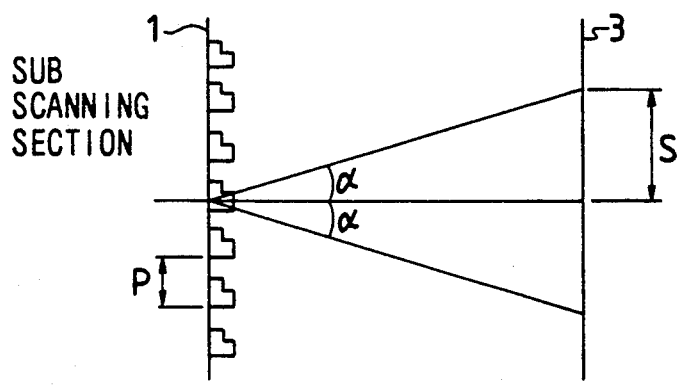
FIG. 10 is a view for explaining a separation distance of the blazed diffraction grating.

On the other hand, a diffraction angle $\alpha$ of the blazed diffraction grating 1 is given by $P\sin\alpha = \lambda$ (P: grating pitch, and $\lambda$: wavelength) in FIG. 8. FIG. 10 is a view for explaining a separation distance produced by the blazed diffraction grating.

Thus, a separation distance S shown in FIG. 10 between color-separated light beams on the sensor element surface is given by $S = l_0 \tan \alpha$ for a light ray on the axis, and is given by $S = l_1 \tan \alpha = l_0 \tan\alpha/\cos \theta'$ for a light ray outside the axis. The distances of these rays do not coincide with each other. In this manner, the light ray on the axis has a different separation distance on the sensor element from that of the light ray outside the axis. In a three-line sensor having a constant sensor array interval, three color light beams cannot be correctly focused on the corresponding sensor arrays 4, 5, and 6 over the entire field angle.

For example, when $P = 60$ μm, $\lambda = 540$ nm (green), a field angle $\theta \approx \theta' = 20$ deg, and $l_0 = 20$ mm, a difference between separation distances of a light ray on the axis and a light ray outside the axis is about 11.5 μm. As compared to the element size 7 μm × 7 μm or 10 μm × 10 μm of the sensor 3, the focusing center of each light beam is considerably deviated from the center of the sensor element. If the field angle $\theta$ is decreased, this deviation can be theoretically decreased. However, the field angle $\theta$ cannot be decreased so much in terms of compactness of the apparatus.

For example, the grating pitch P for $P\sin\alpha = \lambda$ is changed on and outside the axis to change the diffraction angle $\alpha$ of first-order diffracted light, so that three color light beams can be correctly focused on the sensor arrays 4, 5, and 6 of the sensor 3 over the entire field angle. As described above, when the grating pitch P on the axis is given by $P = 60$ μm, $\lambda = 540$ nm, and $l_0 = 20$ mm, the grating pitch at a position where the principal ray of light having a field angle $\theta \approx \theta' = 20$ deg is incident on the diffraction grating is given by $P = 63.85$ μm.

Figure 11:
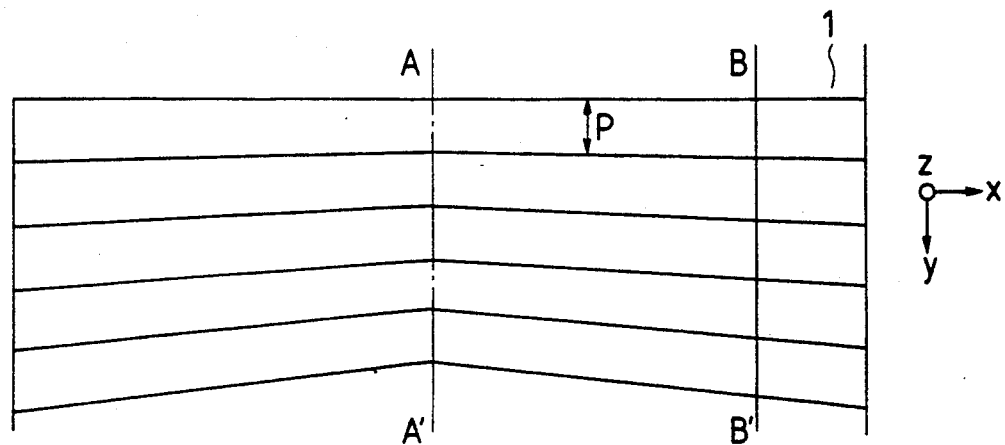
FIGS. 11 and 12 are views for explaining a change in grating pitch of the blazed diffraction grating.
Figure 12:
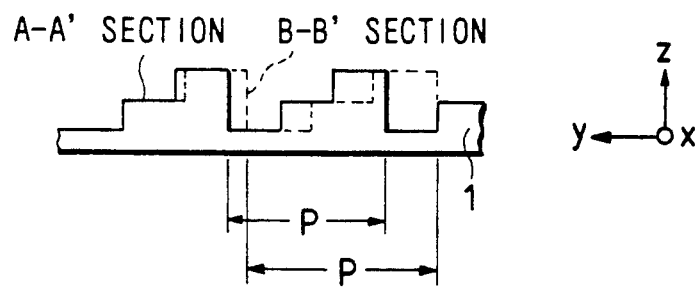

More specifically, as shown in FIGS. 11 and 12, the grating pitch P of the linear blazed diffraction grating 1 is continuously changed from an A—A' section corresponding to a position on the axis toward a B—B' section corresponding to a position outside the axis in correspondence with an exit angle from the focusing optical system 9, which changes according to the field angle.

In other words, the grating pitch of the linear blazed diffraction grating is changed in correspondence with the exit angle of light emerging from the focusing optical system which changes in accordance with the field angle.

In this manner, the pitch of the blazed diffraction grating of the present invention is continuously changed along the X direction as a direction perpendicular to the Y direction in which stepped diffraction gratings are periodically formed and to the Z direction as a thickness direction of the diffraction grating, as shown in FIG. 11.

When the linear blazed diffraction grating in which the grating pitch of the blazed diffraction grating is continuously changed in correspondence with a field angle of the principal ray of light emerging from the object and incident on the grating is applied to the image reading apparatus shown in FIGS. 6A and 6B, an offset of a focusing position can be corrected, and color-separated light components can be correctly focused on the corresponding sensor arrays.

Furthermore, in addition to two patterns of structures of the blazed diffraction grating of the present invention, the grating thickness of the blazed diffraction grating is changed in correspondence with an angle of light incident on the diffraction grating, and the grating pitch of the blazed diffraction grating is changed in correspondence with the field angle of the principal ray of light emerging from an object and incident on the diffraction grating. Thus, light from image information having a finite width can be separated into a plurality of light components of different wavelength ranges without causing color shift, and the color-separated light components can be correctly focused on the corresponding sensor arrays. In addition, an offset of a focusing position can be corrected. As a result, good color separation and focusing performances free from an offset of a focusing position and a shift in blaze wavelength can be achieved.

Since the linear blazed diffraction grating 1 of the embodiment described above has grating thicknesses $d_1$ and $d_2$ which are changed in correspondence with a field angle, if the grating pitch is changed in addition to the grating thicknesses, the grating shape is two-dimensionally complicated, resulting in difficulty in the manufacture.

Figure 13:
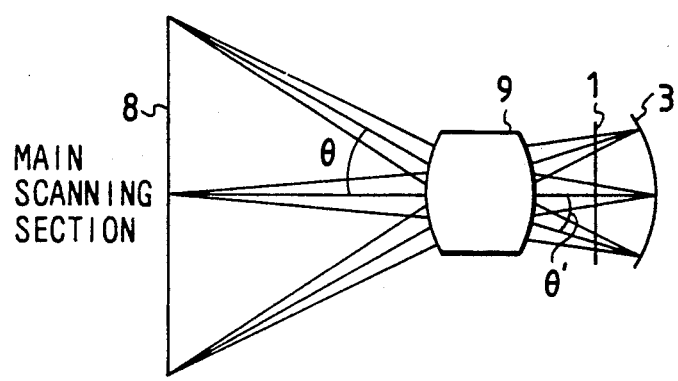
FIG. 13 is a view showing a modification of the present invention.

Thus, as shown in a modification of the present invention in FIG. 13, an offset of focusing positions on the sensor arrays 4, 5, and 6 is corrected by curving the three-line sensor 3, so that an optical path length between the linear blazed diffraction grating 1 and the sensor 3 is kept constant over the entire field angle, thereby eliminating an offset of focusing positions on the axis and at a position outside the axis. With this structure, information light having a field angle can be satisfactorily color-separated and focused by the blazed diffraction grating 1 with a relatively simple structure without changing a grating pitch, thus improving producibility of the apparatus and reducing cost.

When the curved sensor is used in the image reading apparatus according to the present invention described above, a light beam having a field angle from an object is separated into a plurality of light components of different wavelength ranges through the focusing optical system and the linear blazed diffraction grating, and the separated light components are focused on the corresponding sensor arrays on the sensor. In addition, the sensor is curved so that an optical path length between the sensor and the blazed diffraction grating is kept constant over the entire field angle.

With this structure, an offset of a focusing position can be corrected without changing the grating pitch of the blazed diffraction grating in correspondence with the field angle of the principal ray of light emerging from an object and incident on the diffraction grating.

Furthermore, in addition to the structure of the blazed diffraction grating of the present invention, the grating thicknesses of the blazed diffraction grating are changed in correspondence with an angle of light incident on the diffraction grating, and the multiline sensor is curved so that an optical path length between the sensor and the blazed diffraction grating is kept constant over the entire field angle. Thus, light from image information having a finite width can be separated into a plurality of light components of different wavelength ranges without causing color shift, and the color-separated light components can be correctly focused on the corresponding sensor arrays. In addition, an offset of a focusing position can be corrected. As a result, good color separation and focusing performances free from an offset of a focusing position and a shift in blaze wavelength can be achieved.

Another embodiment of the present invention for solving the problem of wavelength shift will be described below.

Figure 14A:
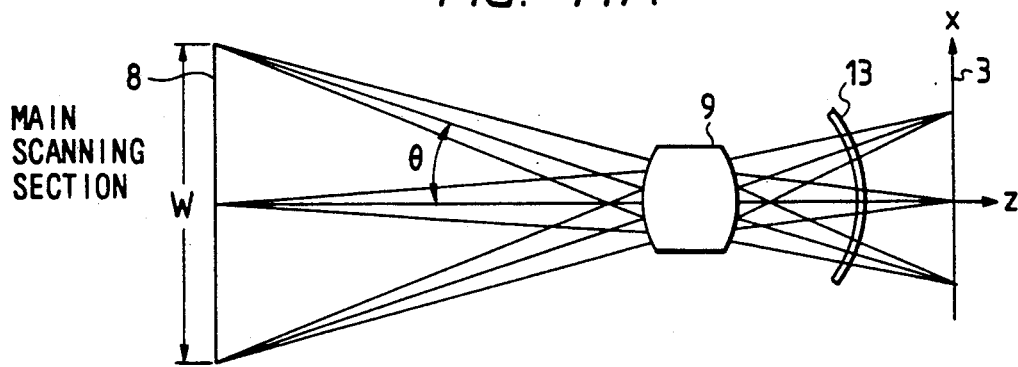
FIGS. 14A and 14B are views showing an image reading apparatus of the present invention.
Figure 14B:
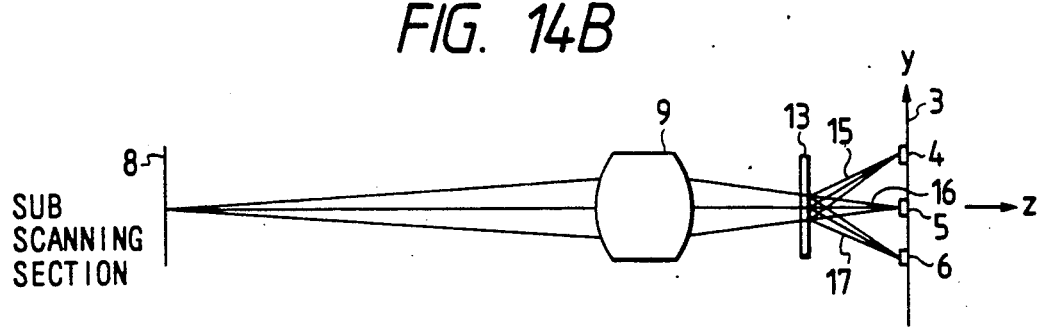

FIGS. 14A and 14B are views showing an image reading apparatus including a blazed diffraction grating of the present invention. FIG. 14A shows a a main scanning section, and FIG. 14B shows a sub-scanning section perpendicular to the main scanning section.

In FIGS. 14A and 14B, image information on an original surface 8 is line-scanned by a mirror (not shown) arranged between the original surface 8 and a focusing optical system 9 in the sub-scanning direction (Y direction in FIG. 14B) in the same manner as in the apparatus shown in FIGS. 6A and 6B. Image information light is guided to a linear blazed diffraction grating 13 for three-color separation, which is curved so that its concave surface faces the focusing optical system 9 in the main scanning section focusing optical system 9. The information light is separated into three color light components (e.g., R, G, and B) in the so-called color reading in Y direction of the figure, and the three light components are then focused on sensor arrays 4, 5, and 6 on a monolithic three-line sensor 3. The sensor furface of the three-line sensor 3 is arranged to be parallel to the line scanning direction (sub-scanning direction).

The sensor arrays 4, 5, and 6 on the sensor 3 extend in the main scanning direction (X direction in FIG. 14A). The sensor 3 is a multiline sensor on which a plurality of linear sensor arrays are formed on a single substrate. The multiline sensor is a monolithic three-line sensor on which three lines of linear sensor arrays are arranged to be separated in a direction perpendicular to the array direction of the sensor array by a finite distance.

The linear blazed diffraction grating 13 is inserted in an optical path between the focusing optical system 9 and the sensor 3 to separate light from an object into a plurality of color light components, and to guide the separated light components to the corresponding sensor arrays.

Of course, the original surface 8 is illuminated with an illumination light source (not shown) in order to read information.

The linear blazed diffraction grating 13 separates light from an object into a plurality of color light components in the sub-scanning direction perpendicular to the array direction.

Figure 15:
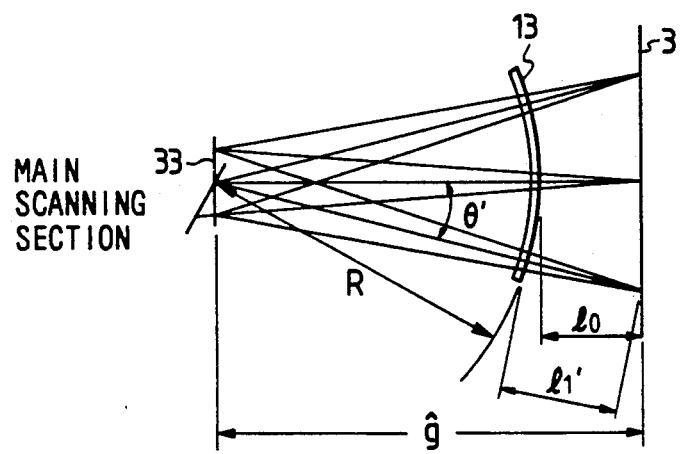
FIG. 15 is a view for explaining a curvature of the blazed diffraction grating.

In this manner, the linear blazed diffraction grating 13 is formed to have a substrate shape as a portion of a cylindrical surface having a radius R having an exit pupil 33 as substantially the center or an approximate quadratic curved surface along the array direction of the sensor arrays 4, 5, and 6 in the main scanning section, as shown in FIG. 15. The grating thickness of the linear blazed diffraction grating 13 is constant without being changed in correspondence with a field angle of the principal ray of light from an object and incident on the diffration grating.

Thus, the principal ray of exit light having an exit angle $\theta'$ always becomes perpendicular to the grating surface of the diffraction grating 13, and angular dependency on $\theta'$ in the phase difference $\Phi_i$ can be eliminated. Thus, a shift of a blaze wavelength caused by a field angle $\theta$ can be prevented, thus eliminating color shift in reading.

However, when the linear diffraction grating 13 is merely curved so that its concave surface faces the focusing optical system 9, the problem of a difference between the separation distances S on and outside the axis is left unsolved. More specifically, when the distance between the grating and the sensor surface on the axis is represented by $l_0$, the distance outside the axis (exit angle $\theta'$) is given by $l'_1 = \hat{g}/\cos\hat{\theta}' - R$, as shown in FIG. 15. This distance changes in accordance with the field angle $\theta$ (where $\hat{g}$ is the distance between the exit pupil 33 and the sensor 3, and $l'_1$ is the distance between the grating and the sensor along the direction of the exit angle $\theta'$).

In order to correct an offset of the focusing positions, as shown in FIGS. 11 and 12 described above, the grating pitch P of the linear blazed diffraction grating 13 need only be continuously changed from the A—A' section corresponding to a position on the axis toward the B—B' section corresponding to a position outside the axis.

As described above, sinα of the first-order diffraction angle is inversely proportional to the grating pitch P for light having the same wavelength (sinα = λ/P). By utilizing this relationship, if a distance between the grating and the sensor is varied, P can be changed to make the separation distance on the sensor constant.

In general, since the first-order diffraction angle $\alpha$ is small, $\sin\alpha \cong \tan\alpha \cong \alpha$ (rad), and the separation distance between color-separated light components on the sensor has the relationship with light having the exit angle $\theta'$, which is given by $l'_1 \tan\alpha \cong (\hat{g}/\cos\theta' - R)\alpha \cong (\hat{g}/\cos\theta' - R)\lambda/P$.

Therefore, at a position $R \cdot \sin\theta'$ from the center (i.e., intersection with the optical axis) in the main scanning section of the cylindrical linear blazed diffraction grating 13, if the grating pitch in the sub-scanning direction can be set to satisfy $P = (\hat{g}/\cos\theta' - R)\lambda/S$ (i.e., the pitch is increased as a distance from the axis is increased, as shown in FIG. 11), $l' \tan\alpha \cong S$ (S: the distance between the parallel sensor arrays 4, 5 and 6), and the separation distance can be constant regardless of the field angle $\theta$. Thus, separated light components can always be correctly focused on the parallel sensor arrays 4, 5, and 6.

For example, in the above-mentioned case (P=60 μm and λ=540 nm), if $\hat{g}$=55 mm, R=35 mm, and S=0.18 mm, the grating pitch P at $\theta'$=0 deg is 60 μm, while the grating pitch at $\theta'$=20 deg is 70 μm. This means that a change in grating pitch of 10 μm need only be given to a position separated from the optical axis by 12 mm in the main scanning section. Therefore, such numerical values can be easily realized in consideration of the present photomask precision techniques and other machining techniques.

As described above, in the image reading apparatus of the present invention using the curved diffraction grating, a light beam reflected at a certain angle by an object is separated into light components of different waveform ranges through a focusing optical system and a linear blazed diffraction grating, and these light components are focused on corresponding sensor arrays on a sensor. In addition, the linear blazed diffraction grating is curved along the array direction of the sensor array so that its concave surface opposed to the surface on which the stepped diffraction gratings are periodically formed faces the focusing optical system.

With this structure, light outside the axis can always be perpendicularly incident on the linear blazed diffraction grating, and color shift (shift of a blaze wavelength) depending on a field angle can be eliminated.

Since the grating pitch is changed to be continuously increased in accordance with an exit angle, an offset of focusing positions in the sub-scanning section can also be corrected. Thus, good color separation and focusing performances free from an offset of a focusing position and a shift in blaze wavelength can be achieved.

What is claimed is:

1. An image reading apparatus comprising:
   a multiline sensor having a plurality of linear sensor arrays arranged on a single substrate;
   a focusing optical system for focuing on object image on said multiline sensor; and
   a blazed diffraction grating, disposed in an optical path between said focusing optical system and said multiline sensor, for color-separating light from the object into a plurality of light components, and for guiding the color-separated light components to corresponding sensor arrays, a grating thickness of said blazed diffraction grating varying in correspondence with an angle of light incident on said blazed diffraction grating from said focusing optical system.

2. An apparatus according to claim 1, wherein said multiline sensor includes a plurality of lines of linear sensor arrays arranged to be separated in a direction perpendicular to an array direction of said sensor arrays.

3. An apparatus according to claim 1, wherein said blazed diffraction grating color-separates light from the object into a plurality of light components in a direction perpendicular to an array direction of said sensor arrays.

4. An apparatus according to claim 1, wherein the grating thickness of said blazed diffraction grating varies in correspondence with a field angle with respect to said focusing optical system.

5. An apparatus according to claim 1, wherein the grating thickness of said blazed diffraction grating varies in correspondence with a field angle of a principal ray of light from the object and incident on said blazed diffraction grating.

6. An apparatus according to claim 2, wherein the object is scanned in a sub-scanning direction perpendicular to the array direction of said sensor arrays.

7. An apparatus according to claim 6, wherein a sensor surface of said multiline sensor is parallel to the sub scanning direction.

8. An apparatus according to claim 1, wherein said blazed diffraction grating comprises a linear blazed diffraction grating.

9. An apparatus according to claim 1, wherein said multiline sensor is curved so that an optical path length between said multiline sensor and said blazed diffraction grating is constant over the entire field angle.

10. An apparatus according to claim 9, wherein a grating pitch of said blazed diffraction grating does not vary in correspondence with a field angle of a principal ray of light from the object and incident on said blazed diffraction grating.

11. An image reading apparatus comprising:
    a multiline sensor having a plurality of linear sensor arrays arranged on a single substrate;
    a focusing optical system for focuing an object image on said multiline sensor; and
    a blazed diffraction grating, disposed in an optical path between said focusing optical system and said multiline sensor, for color-separating light from the object into a plurality of light components, and for guiding the color-separated light components to corresponding sensor arrays, a grating pitch of said blazed diffraction grating varying in correspondence with a field angle of a principal ray of light from the object and incident on said blazed diffraction grating.

12. An apparatus according to claim 11, wherein said multiline sensor includes a plurality of lines of linear sensor arrays arranged to be separated in a direction perpendicular to an array direction of said sensor arrays.

13. An apparatus according to claim 11, wherein said blazed diffraction grating color-separates light from the object into a plurality of light components in a direction perpendicular to an array direction of said sensor arrays.

14. An apparatus according to claim 12, wherein the object is scanned in a sub-scanning direction perpendicular to the array direction of said sensor arrays.

15. An apparatus according to claim 14, wherein a sensor surface of said multiline sensor is parallel to the sub scanning direction.

16. An apparatus according to claim 11, wherein said blazed diffraction grating comprises a linear blazed diffraction grating.

17. An image reading apparatus comprising:
a multiline sensor having a plurality of linear sensor arrays arranged on a single substrate;
a focusing optical system for focusing an object image on said multiline sensor; and
a blazed diffraction grating, disposed in an optical path between said focusing optical system and said multiline sensor, for color-separating light from the object into a plurality of light components, and for guiding the color-separated light components to corresponding sensor arrays, a grating thickness of said blazed diffraction grating varying in correspondence with an angle of light incident on said blazed diffraction grating from said focusing optical system, a grating pitch of said blazed diffraction grating varying in correspondence with a field angle of a principal ray of light from the object and incident on said blazed diffraction grating.

18. An image reading apparatus comprising:
a multiline sensor having a plurality of linear sensor arrays arranged on a single substrate;
a focusing optical system for focusing an object image on said multiline sensor; and
a blazed diffraction grating, disposed in an optical path between said focusing optical system and said multiline sensor, for color-separating light from the object into a plurality of light components, and for guiding the color-separated light components to corresponding sensor arrays,
wherein said multiline sensor is curved to cause an optical path length between said multiline sensor and said blazed diffraction grating to be constant over the entire field angle.

19. An apparatus according to claim 18, wherein a grating pitch of said blazed diffraction grating does not vary in correspondence with a field angle of a principal ray of light from the object and incident on said blazed diffraction grating.

20. An image reading apparatus comprising:
a multiline sensor including a plurality of lines of linear sensor arrays which are arranged to be separated in a direction perpendicular to an array direction of said sensor arrays by a finite distance;
a focusing optical system for focusing an object image on said multiline sensor; and
a blazed diffraction grating, disposed in an optical path between said focusing optical system and said multiline sensor, for color-separating light from the object into a plurality of light components, and for guiding the color-separated light components to corresponding sensor arrays, said blazed diffraction grating being curved along the array direction so that a concave surface thereof faces said focusing optical system.

21. An apparatus according to claim 20, wherein a grating thickness of said blazed diffraction grating does not vary in correspondence with a field angle of a principal ray of light from the object and incident on said blazed diffraction grating.

22. An apparatus according to claim 20, wherein said blazed diffraction grating color-separates light from the object into a plurality of light components in a direction perpendicular to the array direction of said sensor arrays.

23. An apparatus according to claim 20, wherein the object is scanned in a sub-scanning direction perpendicular to the array direction of said sensor arrays.

24. An apparatus according to claim 23, wherein a sensor surface of said multiline sensor is arranged to be parallel to the sub-scanning direction.

25. An apparatus according to claim 20, wherein said blazed diffraction grating comprises a linear blazed diffraction grating.

26. An apparatus according to claim 20, wherein a grating pitch of said blazed diffraction grating varies in correspondence with a field angle of a principal ray of light from the object and incident on said blazed diffraction grating.

27. An apparatus according to claim 20, wherein a grating pitch of said blazed diffraction grating varies in correspondence with an exit angle of light output from said focusing optical system, which changes in accordance with a field angle.

* * * * *

UNITED STATES PATENT AND TRADEMARK OFFICE
CERTIFICATE OF CORRECTION

PATENT NO. : 5,113,067

DATED : May 12, 1992

INVENTOR(S) : NAKAI ET AL.

It is certified that error appears in the above-identified patent and that said Letters Patent is hereby corrected as shown below:

On the Title page, item,
[57] ABSTRACT

Line 4, "on and a single substrate," should read --on a single substrate, and--

COLUMN 1

Line 5, "AND SUMMARY" should be deleted.

COLUMN 1

Line 39, "dimension" should read --dimensions--.

COLUMN 8

Line 39, close up right margin.

COLUMN 8

Line 40, close up left margin.

UNITED STATES PATENT AND TRADEMARK OFFICE
CERTIFICATE OF CORRECTION

PATENT NO. : 5,113,067
DATED : May 12, 1992
INVENTOR(S) : NAKAI ET AL.

It is certified that error appears in the above-identified patent and that said Letters Patent is hereby corrected as shown below:

COLUMN 9

Line 54, "focuing on" should read --focusing on--.

COLUMN 10

Line 38, "focuing" should read --focusing--.

Signed and Sealed this

Seventeenth Day of August, 1993

Attest:

BRUCE LEHMAN

Attesting Officer

Commissioner of Patents and Trademarks